US012761877B2

(12) United States Patent
Wei et al.

(10) Patent No.: US 12,761,877 B2
(45) Date of Patent: Oct. 13, 2026

(54) RANDOM NUMBER GENERATOR AND RANDOM NUMBER GENERATION METHOD

(71) Applicants: Beijing BOE Technology Development Co., Ltd., Beijing (CN); BOE Technology Group Co., Ltd., Beijing (CN)

(72) Inventors: Xiangye Wei, Beijing (CN); Liming Xiu, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 748 days.

(21) Appl. No.: 17/778,581

(22) PCT Filed: Jul. 7, 2021

(86) PCT No.: PCT/CN2021/105034
§ 371 (c)(1),
(2) Date: May 20, 2022

(87) PCT Pub. No.: WO2022/042065
PCT Pub. Date: Mar. 3, 2022

(65) Prior Publication Data

US 2023/0176820 A1 Jun. 8, 2023

(30) Foreign Application Priority Data

Aug. 31, 2020 (CN) ......................... 202010898911.6

(51) Int. Cl.
*G06F 7/58* (2006.01)

(52) U.S. Cl.
CPC .................................... *G06F 7/588* (2013.01)

(58) Field of Classification Search
CPC ....................................................... G06F 7/588
See application file for complete search history.

(56) References Cited

U.S. PATENT DOCUMENTS 4,646,032 A 2/1987 Wheatley, III et al.
7,587,439 B1 * 9/2009 Onufryk ................ G06F 7/588 708/250

(Continued)

FOREIGN PATENT DOCUMENTS

CN 107797788 A 3/2018

OTHER PUBLICATIONS

T. Addabbo, M. Alioto, A. Fort, S. Rocchi and V. Vignoli, "Efficient Post-Processing Module for a Chaos-based Random Bit Generator," 2006 13th IEEE International Conference on Electronics, Circuits and Systems, Nice, France, 2006 (Year: 2006).*

(Continued)

*Primary Examiner* — Andrew Caldwell
*Assistant Examiner* — Phat N Le
(74) *Attorney, Agent, or Firm* — IPro, PLLC

(57) ABSTRACT

Provided is a random number generator. The random number generator includes: a control word providing circuit, a pulse generating circuit and a random number generating circuit. The control word providing circuit is configured to generate a plurality of control words in response to a first rule. The pulse generating circuit is connected to the control word providing circuit and configured to output a plurality of channels of pulse signals in response to the plurality of control words. The random number generating circuit is connected to the pulse generating circuit and configured to generate a random number sequence by performing a logical operation on the plurality of pulse signals.

20 Claims, 7 Drawing Sheets

(56) References Cited

U.S. PATENT DOCUMENTS

| | | | | |
|---|---|---|---|---|
| 2007/0244951 | A1 | 10/2007 | Gressel et al. | |
| 2010/0281088 | A1* | 11/2010 | Wilber | G06F 7/588 708/251 |
| 2013/0073598 | A1 | 3/2013 | Jacobson et al. | |
| 2014/0250160 | A1* | 9/2014 | Ihor | H03K 3/84 708/251 |

OTHER PUBLICATIONS

L. Xiu, "All digital FPGA-implementable time-average-frequency direct period synthesis for IoT applications," 2017 IEEE International Symposium on Circuits and Systems (ISCAS), Baltimore, MD, USA, 2017 (Year: 2017).*

Wei, Xiangye, and Liming Xiu. "An all digital highly programable TAF-DPS based true random number generator working on principles of frequency-mixing and frequency-tracking." 2020 IEEE International Symposium on Circuits and Systems (ISCAS). IEEE, Sep. 28, 2020.

CN202010898911.6 first office action dated May 30, 2025.

* cited by examiner

RANDOM NUMBER GENERATOR AND RANDOM NUMBER GENERATION METHOD

CROSS-REFERENCE TO RELATED APPLICATION

This application is a U.S. national stage of international application No. PCT/CN2021/105034, filed on Jul. 7, 2021, which claims priority to Chinese Patent Application No. 202010898911.6, filed on Aug. 31, 2020, and entitled “RANDOM NUMBER GENERATOR AND RANDOM NUMBER GENERATION METHOD,” the disclosures of which are herein incorporated by reference in their entireties.

TECHNICAL FIELD

The present disclosure relates to a random number generator and a method for generating a random number.

BACKGROUND

Information encryption can be performed in common by software and hardware. The hardware is responsible for providing a random number, and the software is responsible for generating a more complex key based on the random number provided by the hardware, and encrypting information with the key.

Currently, random number generation is primarily to generate a random number by using physical noise in nature, such as device noise, nuclear decay noise, Brownian motion noise, thermal noise, and the like. The random number is generated by amplifying, extracting and post processing these noises.

SUMMARY

Embodiments of the present disclosure provide a random number generator and a method for generating a random number.

At least one embodiment of the present disclosure provides a random number generator. The random number includes:

a control word providing circuit, configured to generate a plurality of control words in response to a first rule;

a pulse generating circuit, connected to the control word providing circuit and configured to output a plurality of pulse signals in response to the plurality of control words, wherein each of the pulse signals includes a first frequency signal and a second frequency signal, wherein an occurrence probability of the first frequency signal in the pulse signal is controlled by a control word corresponding to the first frequency signal, and an occurrence probability of the second frequency signal in the pulse signal is controlled by a control word corresponding to the second frequency signal; and a random number generating circuit, connected to the pulse generating circuit and configured to generate a random number sequence by performing a logical operation on the plurality of pulse signals.

Optionally, the pulse generating circuit includes a plurality of pulse sub-circuits, the plurality of pulse sub-circuits being connected to the control word providing circuit and the random number generating circuit; and each of the plurality of pulse sub-circuits being configured to generate one of the plurality of pulse signals based on one of the plurality of control words.

Optionally, the pulse sub-circuit includes: a signal generator and a frequency synthesizer, the frequency synthesizer being connected to the signal generator, the control word providing circuit and the random number generating circuit; wherein the signal generator is configured to generate reference pulse signals with phases evenly spaced in response to an initial pulse signal;

the frequency synthesizer is configured to generate the pulse signal in response to the reference pulse signals and the control word;

wherein the control word includes a first coefficient and a second coefficient; and the pulse signal includes the first frequency signal generated based on the reference pulse signals and the first coefficient and the second frequency signal generated based on the reference pulse signals and the second coefficient, and proportions of the first frequency signal and the second frequency signal in the pulse signal are controlled by the second coefficient.

Optionally, the frequency synthesizer includes: a first processing unit, a second processing unit and an output unit; wherein the first processing unit is connected to the control word providing circuit and configured to generate a first control signal and a second control signal based on the control word;

the second processing unit is connected to the first processing unit and configured to select a first pulse signal from the reference pulse signals with phases evenly spaced based on the first control signal, select a second pulse signal from the reference pulse signals based on the second control signal, and select one of the first pulse signal and the second pulse signal as an output signal; and the output unit is connected to the second processing unit and configured to generate the pulse signal based on the output signal of the second processing unit.

Optionally, the random number generating circuit includes: a first processing sub-circuit and a second processing sub-circuit; wherein the first processing sub-circuit is connected to the pulse generating circuit and configured to perform a first processing on the plurality of pulse signals, the first processing including at least one of exclusive-OR, inclusive-OR, or NAND; and the second processing sub-circuit is connected to the first processing sub-circuit and configured to perform a second processing on a plurality of pulse signals performed with the first processing; wherein the second processing includes acquiring the random number sequence by sampling, based on the clock signal, the signals output by the first processing sub-circuit.

Optionally, the random number generating circuit further includes: a clock sub-circuit, wherein the clock sub-circuit is connected to the second processing sub-circuit and configured to provide the clock signal to the second processing sub-circuit.

Optionally, the clock sub-circuit is configured to take an output of one of the plurality of pulse sub-circuits as the clock signal; or the clock sub-circuit is configured to take an output of an external clock as the clock signal.

Optionally, the random number generator further includes:

- a post-processing circuit, connected to the random number generating circuit and configured to perform a probability deviation correction on the random number sequence output by the random number generating circuit.

Optionally, the post-processing circuit includes:

- a storage module, configured to store a random sequence;
- a processing module, connected to the random number generating circuit and the storage module, and configured to generate a first random number based on a random number output by the random number generating circuit and one bit in the random sequence of the storage module; and
- an operation module, connected to the processing module and configured to output a third random number by performing a logical operation on the first random number output by the processing module and a second random number output by the operation module in the last period.

Optionally, each of the plurality of control words is a numerical value and integer portions of the plurality of control words are coprime.

At least one embodiment of the present disclosure provides a method for generating a random number. The method includes:

- generating a plurality of control words in response to a first rule;
- outputting a plurality of pulse signals in response to the plurality of control words, wherein each of the pulse signals includes a first frequency signal and a second frequency signal, wherein an occurrence probability of the first frequency signal in the pulse signal is controlled by a control word corresponding to the first frequency signal, and an occurrence probability of the second frequency signal in the pulse signal is controlled by a control word corresponding to the second frequency signal; and
- generating a random number sequence by performing a logical operation on the plurality of pulse signals.

Optionally, outputting the plurality of pulse signals in response to the plurality of control words includes:

- generating reference pulse signals with phases evenly spaced in response to an initial pulse signal; and
- generating the pulse signal in response to the reference pulse signals and the control word;
- wherein the control word includes a first coefficient and a second coefficient; and
- the pulse signal includes the first frequency signal generated based on the reference pulse signals and the first coefficient and the second frequency signal generated based on the reference pulse signals and the second coefficient, and proportions of the first frequency signal and the second frequency signal in the pulse signal are controlled by the second coefficient.

Optionally, generating the random number sequence by performing the logical operation on the plurality of pulse signals includes:

- performing a first processing on the plurality of pulse signals, wherein the first processing includes at least one of exclusive-OR, inclusive-OR, or NAND; and
- performing a second processing on a plurality of pulse signals performed with the first processing, wherein the second processing includes acquiring the random number sequence by sampling, based on a clock signal, the signals output after the first processing is performed.

Optionally, the method further includes:

- performing a probability deviation correction on a random number sequence output by a random number generating circuit.

Optionally, performing the probability deviation correction on the random number sequence output by the random number generating circuit includes:

- generating a first random number based on the generated random number sequence and one bit in a random sequence; and
- outputting a third random number by performing a logical operation on the first random number and a second random number output in the last period.

DETAILED DESCRIPTION

For clearer descriptions of the technical solutions and advantages of the present disclosure, embodiments of the present disclosure are described in detail hereinafter with reference to the accompanying drawings.

With the advent of 5G and the rapid development of Internet of Things, as large as enterprise servers, as small as personal heart rate meters, are tied into the network. Thus, information security and personal privacy concerns have gained widespread attention. Information protection is critical in Internet of Things and Ethernet.

In the related art, encryption of information is a primary means of ensuring information security. In information encryption technologies, hardware provides an unpredictable random number for encryption, such that a key generated subsequently is unpredictable. Currently, methods for generating a random number by the hardware are primarily performed based on metastability.

Figure 1:
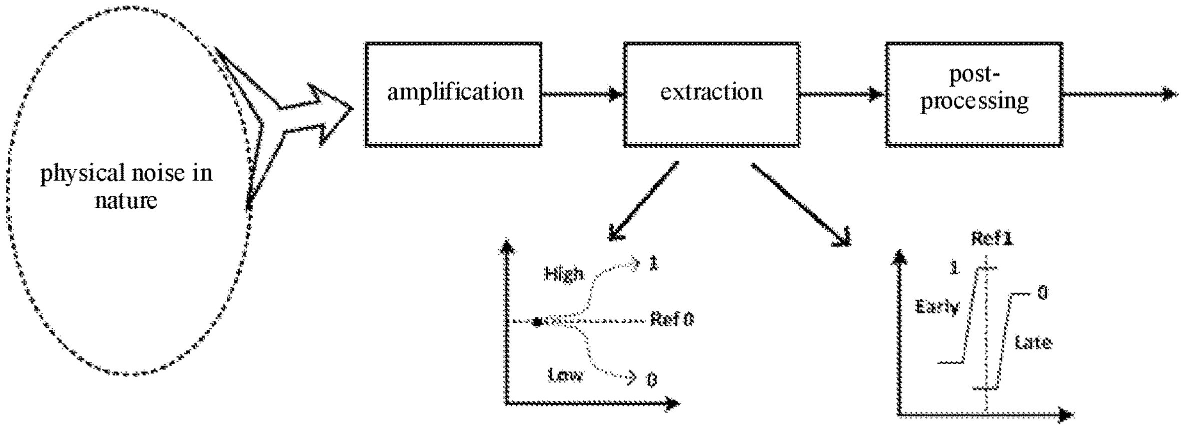
FIG. 1 is a schematic diagram of a method for generating a random number in a related art.

The random number is generated based on physical noise in nature, such as device noise, nuclear decay noise, Brownian motion noise, thermal noise, and the like. By amplifying, extracting, post-processing these noise, an unpredictable 0/1 sequence is acquired. The extraction process is performed based on metastability. As shown in FIG. 1, the circuit for extraction can be mainly divided into two categories. One is a metastability that converting to a voltage domain, wherein a voltage higher than a voltage threshold (Ref0) is 1, and a voltage lower than the voltage threshold (Ref0) is zero. The other is a metastability that converting to the time domain, wherein a pulse earlier than a time threshold (Ref1) is 0, and a pulse later than the time threshold (Ref1) is 1. Such methods based on the metastability are highly affected by process, voltage and temperature (PVT), thus additional circuit are needed to correct the effects.

Figure 2:
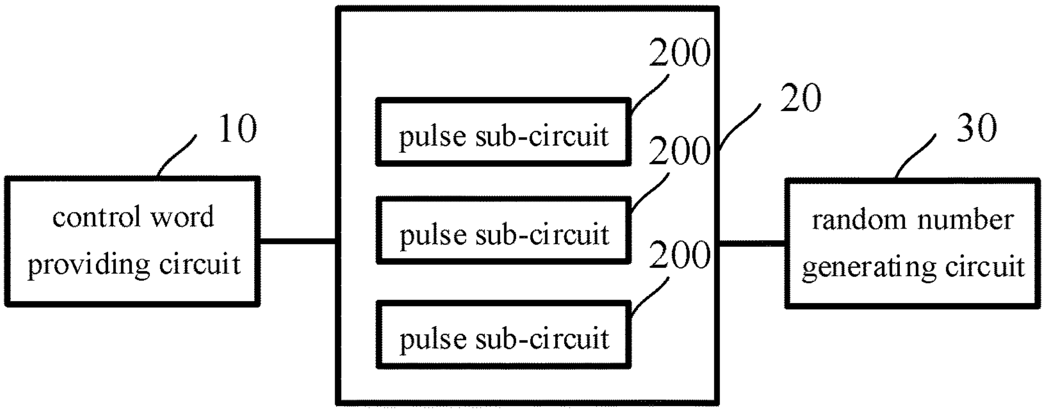
FIG. 2 is a schematic diagram of a structure of a random number generator according to an embodiment of the present disclosure.

FIG. 2 is a schematic diagram of a structure of a random number generator according to an embodiment of the present disclosure. Referring to FIG. 2, the random number generator includes a control word providing circuit 10, a pulse generating circuit 20 and a random number generating circuit 30.

The control word providing circuit 10 is configured to generate a plurality of control words in response to a first rule.

The pulse generating circuit 20 is connected to the control word providing circuit 10 and configured to output a plurality of pulse signals in response to the plurality of control words, wherein each of the pulse signals includes a first frequency signal and a second frequency signal. An occurrence probability of the first frequency signal in the pulse signal is controlled by a control word corresponding to the first frequency signal, and an occurrence probability of the second frequency signal in the pulse signal is controlled by a control word corresponding to the second frequency signal.

The random number generating circuit 30 is connected to the pulse generating circuit 20 and configured to generate a random number sequence by performing a logical operation on the plurality of pulse signals.

In embodiments of the present disclosure, a random number sequence is generated by processing a plurality of pulse signals generated by a pulse sub-circuit 200 in response to the control words. The random number sequence is generated completely based on digital circuits instead of using random noise in nature. The technical solution has the advantages that full digital, low cost, low power consumption, high reliability and high programmability. In addition, the random number generator generates pulse signals including the first frequency signal and the second frequency signal, and then performs a logical operation on the pulse signals, such that an output random number sequence is unpredictable. That is, the random number generator in the present disclosure is capable of outputting a true random number. The random number generator in the present disclosure is a true random number generator (TRNG) that generates a true random number.

In a possible implementation, the first rule may refer to randomly outputting a plurality of control words from a predetermined set of control words. That is, the control word providing circuit 10 randomly outputs the plurality of control words from the predetermined set of control words.

Exemplarily, the control word providing circuit may be implemented in a programmable chip. By programming and determining a set of control words, a range of control words randomly output can be determined. For example, an integer portion of a control word is determined to be generated only from mutually prime numbers such as 3, 5, 7 and 11. In this way, it is ensured that numbers randomly output by the programmable chip are mutually prime numbers. The programmable chip may include a plurality of output channels, such that the programmable chip may simultaneously output the plurality of control words.

In other possible implementations, the first rule may be other rules, such as selecting control words in sequence, which is not limited in the present disclosure.

Referring to FIG. 2, the pulse generating circuit 20 includes a plurality of pulse sub-circuits 200. The plurality of pulse sub-circuits 200 are connected to the control word providing circuit 10 and the random number generating circuit 30. Each of the plurality of pulse sub-circuits 200 is configured to generate one of the plurality of pulse signals based on one of the plurality of control words. Each of the plurality of pulse sub-circuit 200 corresponds to one of the plurality of control words.

Figure 3:
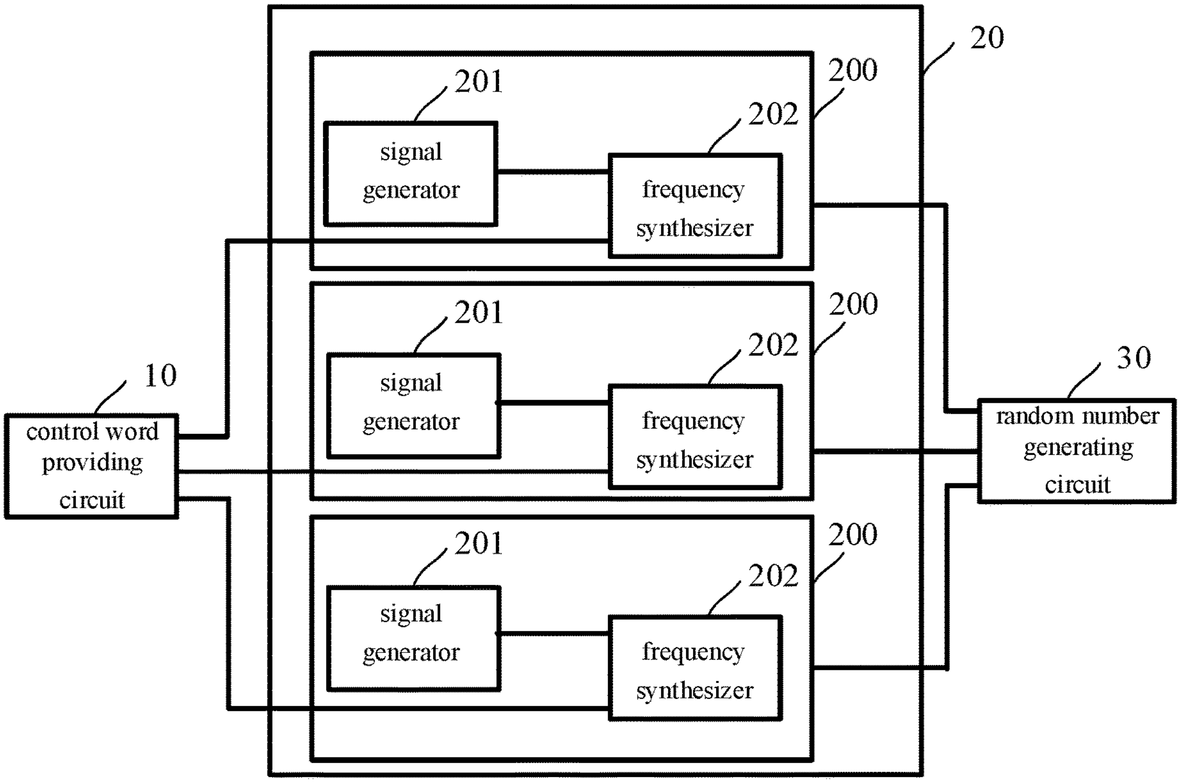
FIG. 3 is a schematic diagram of a structure of a pulse sub-circuit according to an embodiment of the present disclosure.

FIG. 3 is a schematic diagram of a structure of a pulse sub-circuit according to an embodiment of the present disclosure. Referring to FIG. 3, the pulse sub-circuit 200 includes a signal generator 201 and a frequency synthesizer 202.

The frequency synthesizer 202 is configured to connected to the signal generator 201, the control word providing circuit 10 and the random number generating circuit 30.

The signal generator 201 is configured to generate reference pulse signals with phases evenly spaced in response to an initial pulse signal. The frequency synthesizer 202 is configured to generate the pulse signal in response to the reference pulse signals with phases evenly spaced and the control word.

The control word includes a first coefficient and a second coefficient. The pulse signal includes a first frequency signal generated based on the reference pulse signals with phases evenly spaced and the first coefficient, and a second frequency signal generated based on the reference pulse signals with phases evenly spaced and the second coefficient. Proportions of the first frequency signal and the second frequency signal in the pulse signal are controlled by the second coefficient.

In this implementation, the pulse sub-circuit consists of two parts, wherein the signal generator is responsible for generating the reference pulse signals with phases evenly spaced, and the frequency synthesizer is responsible for generating the pulse signal based on the reference pulse signals with phases evenly spaced and the control word.

Exemplarily, the initial pulse signal may be generated by using a voltage controlled oscillator. For example, an LC voltage controlled oscillator (LCVCO) is taken as a vibration source to generate the initial pulse signal. That is, the pulse sub-circuit may further include a voltage controlled oscillator whose output is electrically connected to an input of the signal generator. Different LCVCOs are used in different pulse sub-circuits to generate initial pulse signals. Then, by using different signal generators, initial phases and noise characteristics of the reference pulse signals with phases evenly spaced in the pulse sub-circuits are different, thereby increasing the unpredictability of the final output.

The reference pulse signals with phases evenly spaced refer to a plurality of pulse signals with same phase change and equal initial phase intervals generated by the signal generator 201.

Exemplarily, the signal generator 201 may be a frequency divider, wherein the frequency divider is configured to generate the plurality of reference pulse signals with phases evenly spaced based on the initial pulse signal.

Exemplarily, the signal generator 201 may be a cross-coupled NAND gate.

Exemplarily, the signal generator 201 may be implemented by using a Johnson Counter, wherein the Johnson Counter is also referred to as a twisted-ring counter. Alternatively, the signal generator 201 is implemented with a rotary traveling-wave oscillator (RTWO), which is a clock generation technique based on transmission line. K-channel reference pulse signals with phases evenly spaced can be conveniently generated by using the RTWO. In addition, the signal generator 201 may be implemented by a differential latch.

Figure 4:
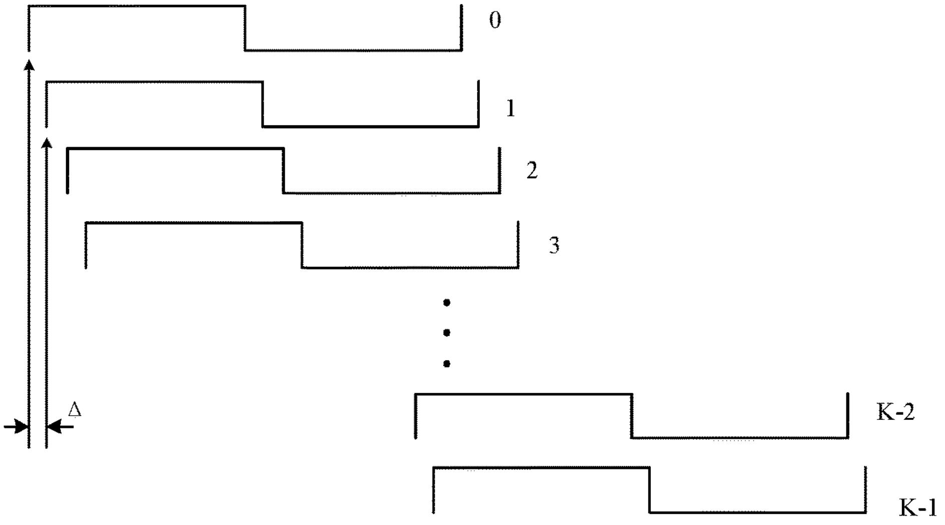
FIG. 4 is a waveform diagram of K-channel reference pulse signals with phases evenly spaced, which are generated by a signal generator shown in FIG. 3.

FIG. 4 is a waveform diagram of K-channel reference pulse signals with phases evenly spaced generated by the signal generator shown in FIG. 3. Referring to FIG. 4, the waveforms of any two of the signals are the same (i.e., periods and amplitudes are the same), and the waveforms of the K-channel signals are evenly spaced, i.e., a same space. A phase difference between any two adjacent signals of the signals is an elementary time unit Δ. Frequency of each of the K-channel signals is $f_i$, wherein the K is an integer greater than 2.

In an implementation of the embodiments of the present disclosure, the frequency synthesizer 202 is configured to generate the pulse signal according to formulas: $T_{TA}=(1-r)*T_A+r*T_B$, $T_A I*\Delta$, $T_B=(I+1)*\Delta$, $T_{TAF}M=(1-r)*I*\Delta+r*(I+1)*\Delta=(I+r)*\Delta$. The control word F is equal to I+r.

$T_{TAF}$ is the period of the pulse signal. $T_A$ is the first frequency signal (or referred to as a first periodic signal). $T_B$ is the second frequency signal (or referred to as a second periodic signal). I is the first coefficient mentioned above, wherein the first coefficient is configured to select from the K-channel reference pulse signals to perform frequency signal synthesis. For example, the control word I is 3. In one period, two reference pulse signals with a phase difference of 3Δ are selected from the K-channel reference pulse signals. Then, the two reference pulse signals are synthesized and $T_A=3\Delta$ is output. In the next period, two reference pulse signals with a phase difference of 4Δ are selected. Then, the two reference pulse signals are synthesized and $T_B=4\Delta$ is output. Δ is the phase difference between any two adjacent signals of the K-channel reference pulse signals with phases evenly spaced. r is the second coefficient mentioned above, wherein the second coefficient is configured to control occurrence probabilities of the first frequency signal and the second frequency signal, r controls the occurrence probability of $T_B$, and 1−r controls the occurrence probability of $T_A$.

In the embodiments of the present disclosure, the control words may be an integer or a number with a decimal point. Each of the control words may be split into an integer portion and a decimal portion, wherein the integer portion is taken as the first coefficient and the decimal portion is taken as the second coefficient, such that the pulse signal synthesis can be performed. For example, in a case that the control word is 5.4, the integer portion is 5 and the decimal portion is 0.4; or in a case that the control word is 6, the integer portion is 6 and the decimal portion is 0.

In the case that the decimal portion of the control word is 0, the pulse signal only consists of one periodic signal $T_A$. Additionally, in a case that the number of decimal portions of the control words are different, the proportions of occurrences of $T_A$ and $T_B$ in the pulse signal are different.

In a possible implementation, the integer portions of the plurality of control words are coprime.

In a case that the integer portions of the plurality of control words are not coprime, the periods of $T_A$ generated in different pulse sub-circuits have a multiple relationship, such that the same waveform may present in the $T_A$ portions in different pulse sub-circuits, resulting in the presence of intermittent same waveform in different pulse signals when logical operations are performed. Therefore, results of the logical operations within these durations are consistent, such that a requirement of randomness cannot be met. By controlling the integer portions of the plurality of the control words to be coprime, the occurrence of the case mentioned above can be avoided, such that the randomness of the random number sequence can be ensured, and entropy value of the noise source is further increased.

In another implementation of the present disclosure, integer portions of the plurality of the control words are not coprime.

Figure 5:
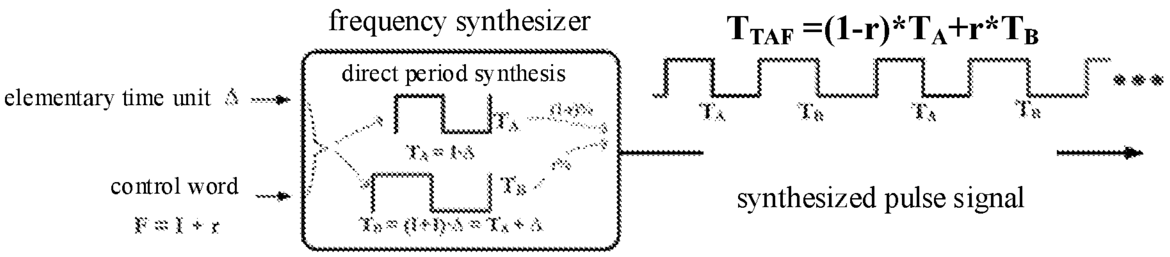
FIG. 5 is a schematic diagram of performing pulse signal synthesis by using a frequency synthesizer.

FIG. 5 is a schematic diagram of performing pulse signal synthesis by using a frequency synthesizer. Referring to FIG. 5, the frequency synthesizer utilizes the time-averaged frequency concept to perform synthesis to output a pulse signal. Synthesis of the first frequency signal is taken as an example for illustration. The frequency synthesizer receives the control word and the K-channel reference pulse signals with phases evenly spaced. The control word F is I+r, wherein I is the integer portion and r is the decimal portion. The phase difference between any two adjacent signals of the K-channel reference pulse signals with phases evenly spaced is the elementary time unit Δ. The frequency synthesizer constructs two different clock periods $T_A$ and $T_B$, wherein $T_A=I\cdot\Delta$, $T_B=(I+1)\cdot\Delta$, based on the elementary time unit Δ and the integer portion I of the control word F. Then, the frequency synthesizer controls the occurrence probabilities of $T_A$ and $T_B$ based on the decimal portion r of the control word F, and generates a pulse signal, wherein the pulse signal includes the above clock periods $T_A$ and $T_B$.

Figure 6:
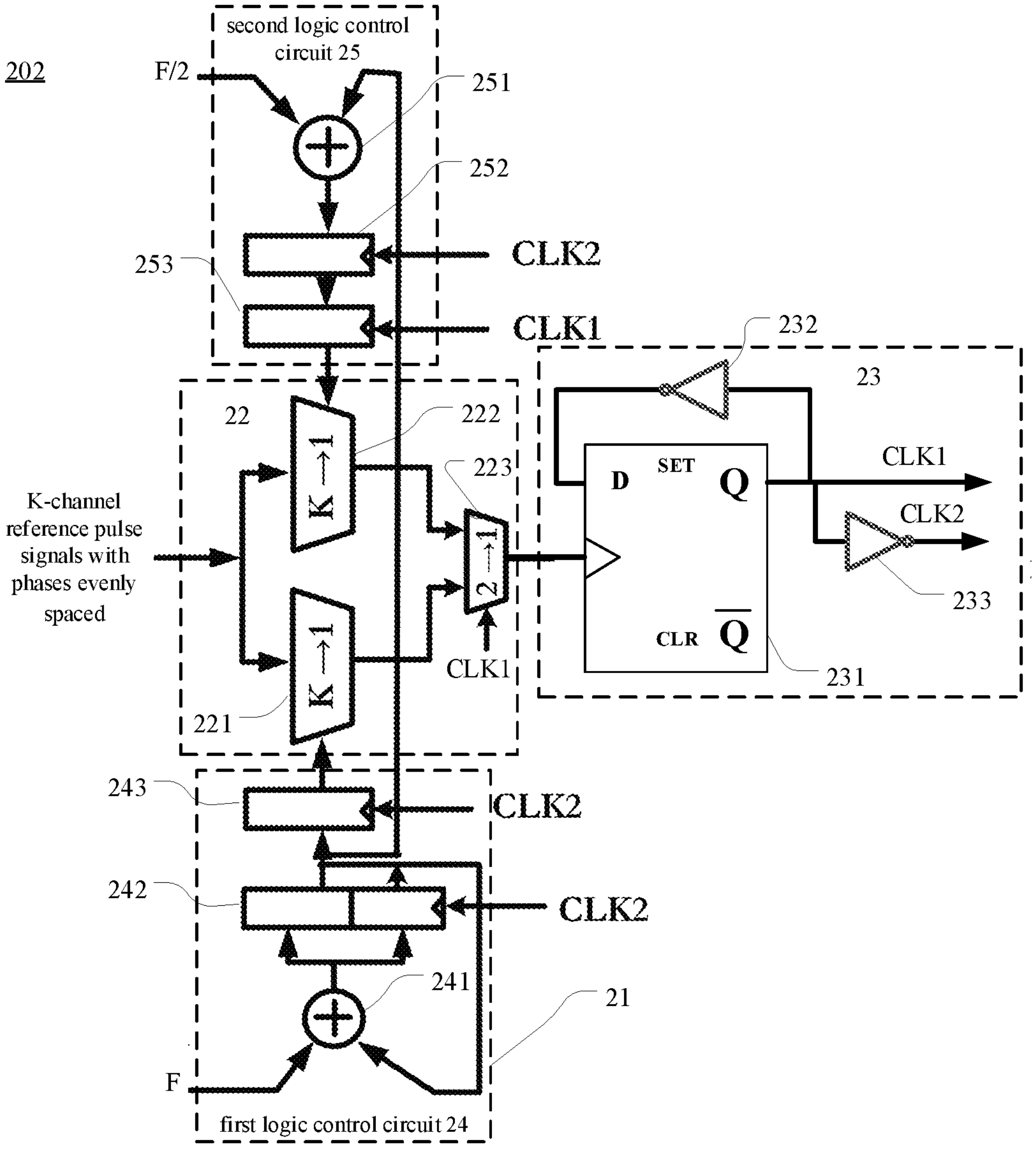
FIG. 6 is a schematic diagram of a structure of a frequency synthesizer according to the present disclosure.

FIG. 6 is a schematic diagram of a structure of a frequency synthesizer according to the present disclosure. Referring to FIG. 6, the frequency synthesizer may include a first processing unit 21, a second processing unit 22 and an output unit 23.

The first processing unit 21 is connected to the control word providing circuit 10, and configured to generate a first control signal and a second control signal based on the control word.

The second processing unit 22 is connected to the first processing unit 21 and configured to select a first pulse signal from the reference pulse signals with phases evenly spaced based on the first control signal, select a second pulse signal from the reference pulse signals based on the second control signal, and select one of the first pulse signal and the second pulse signal as the output signal.

The output unit 23 is connected to the second processing unit 22 and configured to generate the pulse signal based on the output signal of the second processing unit 22.

The detailed operations of the first processing unit 21, the second processing unit 22 and the output unit 23 is described below with reference to FIG. 6.

The first processing unit 21 includes a first logic control circuit 24 and a second logic control circuit 25.

Referring to FIG. 6, the first logic control circuit 24 includes a first adder 241, a first register 242 and a second register 243, wherein the first register 242 is connected to the first adder 241 and the second register 243.

The first adder 241 adds the control word F and the most significant bits (e.g., 5 bits) stored in the first register 242, and saves, in response to a rising edge of a second clock signal CLK2, an add result in the first register 242. Or, the first adder 241 may add the control word F and all information stored in the first register 242, and save, in response to the rising edge of the second clock signal CLK2, an add result to the first register 242. In response to a next rising edge of the second clock signal CLK2, the most significant bits stored in the first register 242 will be stored in the second register 243 as a selection signal of a first K→1 multiplexer 221, that is, the above-mentioned first control signal, wherein the first control signal is configured to select one-channel signal from the K-channel reference pulse signals with phases evenly spaced as the first pulse signal.

When the control word F and the most significant bits stored in the first register 242 are added, in a case that the control word carries, the most significant bits stored in the second register 243 is I+1; and in a case that the control word does not carry, the most significant bits stored in the second register 243 is I. In the case that the I+1 is stored in the second register 243, a corresponding output is $T_B=(I+1)\cdot\Delta$, and in the case that the I is stored in the second register 243, a corresponding output is $T_A=I\cdot\Delta$.

The second logic control circuit 25 includes a second adder 251, a third register 252 and a fourth register 222, wherein the third register 252 is connected to the second adder 251 and the fourth register 222.

The second adder 251 adds half of the control word F/2 and the most significant bits stored in the first register 242, and saves, in response to the rising edge of the second clock signal CLK2, an add result to the third register 252. In response to a next rising edge of the first clock signal CLK1, information stored in the third register 252 is stored in the fourth register 222 as a selection signal of the second K→1 multiplexer 222, that is, the above-mentioned second control signal, wherein the second control signal is configured to select one-channel signal of the K-channel reference pulse signals as the second pulse signal. Referring to FIG. 6, the second processing unit 22 includes the first K→1 multiplexer 221, the second K→1 multiplexer 222 and a 2→1 multiplexer 223. Both the first K→1 multiplexer 221 and the second K→1 multiplexer 222 include a plurality of inputs, a control input and an output. The 2→1 multiplexer 223 includes a control input, an output, a first input and a second input. The output of the first K→1 multiplexer 221 is connected to the first input of the 2→1 multiplexer 223, and the output of the second K→1 multiplexer 222 is connected to the second input of the 2→1 multiplexer 223.

Under the control of the first control signal generated by the first logic control circuit 24, the control input of the first K→1 multiplexer 221 selects one-channel signal from the K-channel reference pulse signals with phases evenly spaced as an output signal, that is, the first pulse signal. Under the control of the second control signal generated by the second logic control circuit 25, the control input of the second K→1 multiplexer 222 selects one-channel signal from the K-channel reference pulse signals with phases evenly spaced as an output signal, that is, the second pulse signal.

The first K→1 multiplexer is taken as an example. When the output signal is selected, the output signal may be selected based on a value of the first control signal. For example, the first control signal is 3, the third-channel signal of the K-channel reference signals with phases evenly space is selected to be the output signal.

The 2→1 multiplexer 223 may select, in response to the rising edge of the first clock signal CLK1, one of the first pulse signal output by the first K→1 multiplexer 221 and the second pulse signal output by the second K→1 multiplexer 222 as the output signal of the 2→1 multiplexer 223.

Because the 2→1 multiplexer selects from the output of two K→1 multiplexers, the output of the two K→1 multiplexers is combined to form a new period. Due to an integer number of A between the first pulse signal and the second pulse signal output by the two K→1 multiplexers, two different periods of $T_A$ and $T_B$ are present in the pulse signal output by the frequency synthesizer.

Referring to FIG. 6, the output unit 23 includes a trigger circuit. The trigger circuit is configured to generate a burst. The trigger circuit includes a data flip-flop 231, a first inverter 232 and a second inverter 233. The data flip-flop 231 includes a data input, a clock input and an output. The first inverter 232 includes an input and an output. The second inverter 233 includes an input and an output. The clock input of the data flip-flop 231 is connected to the 2→1 multiplexer 223, the data input of the data flip-flop 231 is connected to the output of the first inverter 232, and the output of the data flip-flop 231 is connected to the input of the first inverter 232 and the input of the second inverter 233. The output of the data flip-flop 231 or the output of the second inverter 233 may be taken as the output of the frequency synthesizer, that is, one end being configured to generate the pulse signal.

The data flip-flop 231 receives the output from the output of the 2→1 multiplexer 223 through the clock input, and outputs the first clock signal CLK1 through the output. The first inverter 232 receives the first clock signal CLK1 through the input, and outputs the output signal to the data input of the data flip-flop 231. The second inverter 233 receives the first clock signal CLK1 through the input, and outputs the second pulse signal CLK2 through the output.

The first clock signal CLK1 is connected to the control input of the 2→1 multiplexer 223, and the output of the first inverter 232 is connected to the data input of the data flip-flop 231.

Figure 7:
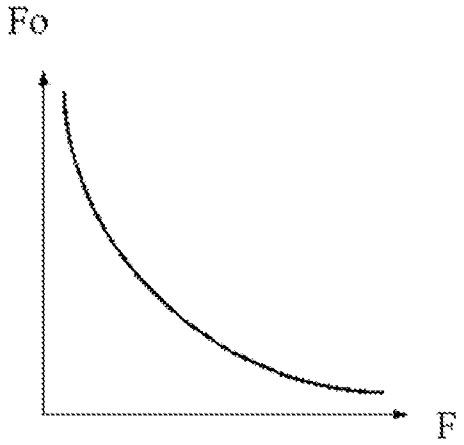
FIG. 7 is a schematic diagram of a relationship between a frequency Fo of a pulse signal and a control word F according to the present disclosure.

The relationship between a frequency Fo of an output pulse signal and a control word F is shown in FIG. 7. The relationship is $Fo=1/(F\cdot\Delta)$. It can be seen that, in a case that the phase difference Δ is determined, the frequency Fo is inversely proportional to the control word F, that is, the larger the control word is, the lower the frequency is.

Figure 8:
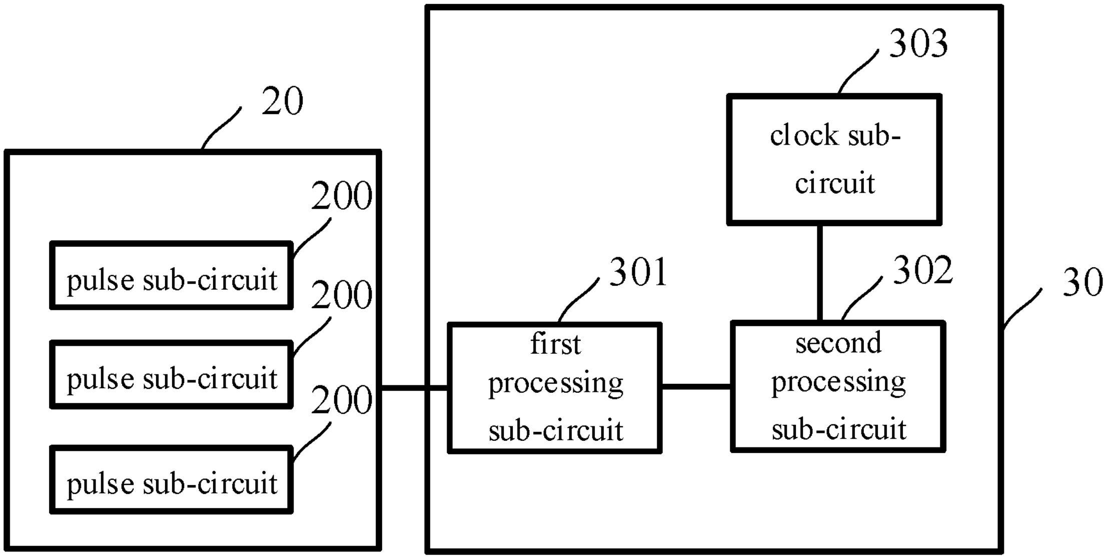
FIG. 8 is a schematic diagram of a structure of a random number generating circuit according to an embodiment of the present disclosure.

FIG. 8 is a schematic diagram of a structure of a random number generating circuit according to an embodiment of the present disclosure. Referring to FIG. 8, the random number generating circuit 30 includes a first processing sub-circuit 301 and a second processing sub-circuit 302.

The first processing sub-circuit 301 is connected to pulse generating circuit 20 and configured to perform a first processing on the plurality of pulse signals, wherein the first processing includes at least one of exclusive-OR, inclusive-OR or NAND.

The second processing sub-circuit 302 is connected to the first processing sub-circuit 301 and configured to perform a second processing on a plurality of pulse signals performed with the first processing.

The second processing includes acquiring the random number sequence by sampling, based on the clock signal, the signals output by the first processing sub-circuit 301.

In this implementation, the plurality of pulse signals are performed with a logical operation such as exclusive-OR or inclusive-OR. The signals are performed with sampling, to increase an entropy value of the bits in the output signals, thereby ensuring the randomness of the signal.

Figure 9:
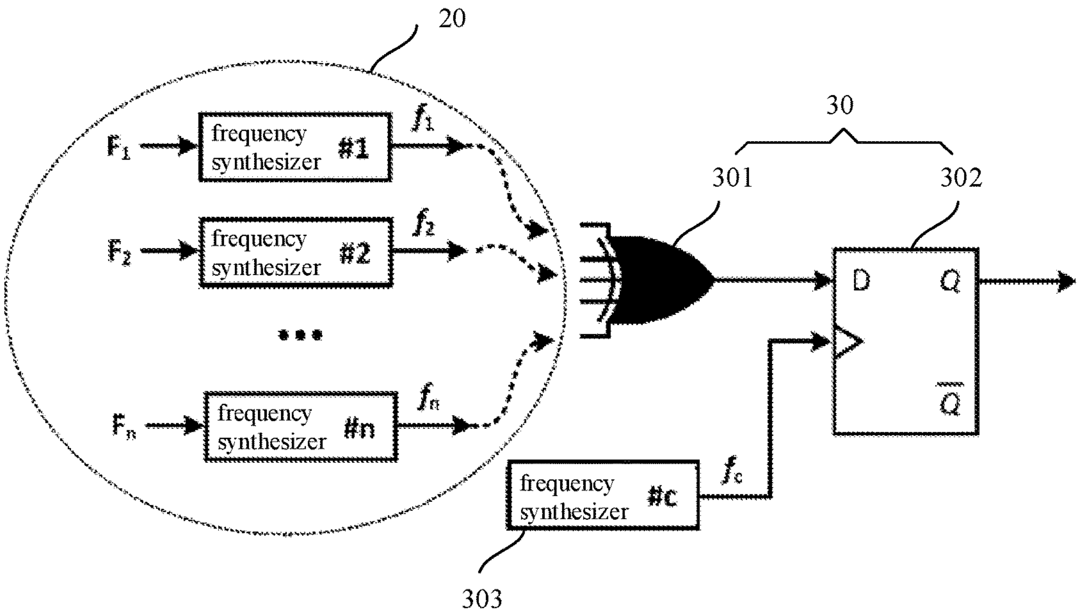
FIG. 9 is a detailed schematic diagram of a random number generating circuit according to an embodiment of the present disclosure.

FIG. 9 is a detailed schematic diagram of a random number generating circuit according to an embodiment of the present disclosure. Referring to FIG. 9, the first processing sub-circuit 301 may include an exclusive-OR circuit, wherein the exclusive-OR circuit is configured to perform an exclusive-OR operation on the plurality of pulse signals.

The exclusive-OR circuit may compute the plurality of pulse signals as follows: $a \oplus b \oplus c \oplus \ldots \oplus n$, wherein a to n represent the plurality of pulse signals.

In other implementations, the first processing sub-circuit 301 may further include a plurality of logical operation sub-circuits. For example, some pulse signals are performed with the exclusive-OR operation, and other pulse signals are performed with the inclusive-OR operation. Then, a result of the exclusive-OR operation and a result of the inclusive-OR operation are performed with NAND, and a result of the NAND is taken as the output.

As shown in FIG. 9, in a possible implementation, the second processing sub-circuit 302 may include a sampling sub-circuit, wherein the sampling sub-circuit is connected to the exclusive-OR circuit, and the sampling sub-circuit is configured to acquire the random number sequence by sampling, based on the clock signal, the signals output by the exclusive-OR circuit.

As shown in FIG. 9, the pulse generating circuit 20 has n frequency synthesizers, wherein the n frequency synthesizers generate pulses of different frequencies by controlling respective control words $F_1$-$F_n$. Then, the first processing sub-circuit synthesizes all of the waveforms by performing the logical operations to generate a waveform with high unpredictability. The unpredictability of the waveform is mainly caused by two points. First, for the K-channel reference pulse signals input to each of the frequency synthesizers, the reference pulse signals input to each of the frequency synthesizers have different noise special effects and different initial phases, wherein the noise may affect the waveform. For example, a period of an ideal state signal is 20 ms, and a period of a signal may be 19 ms or 21 ms due to the noise, thereby causing different waveforms. In addition, the K-channel input of different frequency synthesizers are generated by different circuits, wherein the different circuits may generate input waveforms with different noise and different initial phases. The initial phase is related to the amount of charge residual within capacitance of a circuit. Different initial phases are caused by different amount of charge residual within capacitance of different circuits at boot time. Second, output and initial phases of the frequency synthesizers are different. Due to the above reasons, the waveform acquired by mixing frequencies has extremely high unpredictability and abnormality.

Referring to FIGS. 8 and 9, the random number generating circuit 30 further includes a clock sub-circuit 303.

The clock sub-circuit 303 is connected to the second processing sub-circuit 302 and configured to provide the clock signal to the second processing sub-circuit 302.

Exemplarily, the clock sub-circuit 303 is configured to take an output of one of the plurality of pulse sub-circuits as the clock signal.

Alternatively, the clock sub-circuit 303 is configured to take an output of an external clock as the clock signal.

In one possible implementation, the clock sub-circuit 303 may acquire the clock signal of the external clock and output to the second processing sub-circuit 302.

In another possible implementation, the frequency synthesizer may acquire a pulse signal of one of the n frequency synthesizers (such as frequency synthesizer c #) in the pulse generating circuit 20, and output the pulse signal as the clock signal to the second processing sub-circuit 302. In this implementation, the frequency synthesizer providing the clock signal may be flexible. For example, for frequencies of clock signals generated base on the n frequency synthesizers, the clock signal is provided by the frequency synthesizer with a lowest frequency in the frequencies of the pulse signals generated by the n frequency synthesizers.

When the clock signal described above is applied, rising edges or falling edges of the clock signal are not periodically arranged, such that the randomness of sampling can be increase by applying this clock signal. The metastability often occurs in the sampling process of the output of the first processing sub-circuit in accordance with the clock signal described above, which further increases the unpredictability of the random number. The occurrence of metastability in the sampling process refers to the metastability caused by the sampling point being just at the rising edge or the falling edge of the output signal of the first processing sub-circuit, at which time 0 or 1 output by the sampling sub-circuit has randomness.

Exemplarily, the sampling sub-circuit includes a data flip-flop (D-Flip Flop, DFF). An input of the data flip-flop is connected to the first processing sub-circuit 301, and a control end of the data flip-flop is connected to the clock sub-circuit 303.

Figure 10:
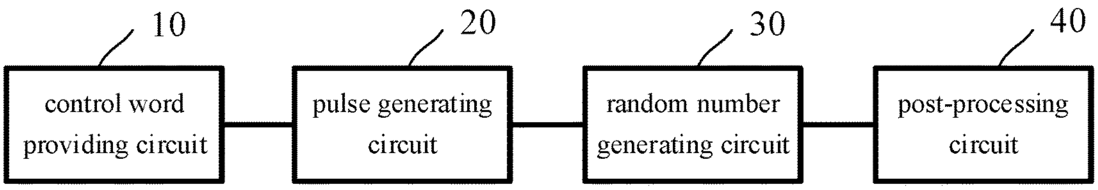
FIG. 10 is a schematic diagram of a structure of another random number generator according to an embodiment of the present disclosure.

FIG. 10 is a schematic diagram of a structure of another random number generator according to an embodiment of the present disclosure. Referring to FIG. 10, the random number generator further includes a post-processing circuit 40.

The post-processing circuit 40 is connected to the random number generating circuit 30 and configured to perform a probability deviation correction on the random number sequence output by the random number generating circuit.

The probability deviation refers to deviation between the occurrence probabilities of bits 0 and 1 in the sequence of random numbers and the occurrence probabilities of 0 and 1 in the true random case. By performing the probability deviation correction on the random number sequence, the proportions of bits 0 and 1 in the random number sequence output by the random number generating circuit is closer to 1:1, and the sequence of bits 0 and 1 is more consistent with a random distribution, thereby increasing the degree of randomness and complexity of the random sequence.

In order to not directly expose the random number to the upper layer application while increasing the information complexity of the random number, the post-processing circuit is designed in the random number generator. Different algorithms may be applied in the post-processing circuit, which includes at least one of Von Neumann correction algorithm, hash algorithm or chaos algorithm. Not directly exposing the random number to the upper layer application refers to not directing outing a sampling result to an encryption application. In the case that the random number is directly exposed, there may be a risk of being cracked.

Different algorithms are applied for different purposes. For example, in a case that 0/1 distribution in the original random number in uneven, XOR correction in the chaos algorithm may be applied, and 0/1 probabilities distribution in a corrected random number sequence tends to be 0.5. One of the algorithms mentioned above may be applied in the post-processing circuit according to the present disclosure, thereby increasing the randomness of the random number sequence.

Figure 11:
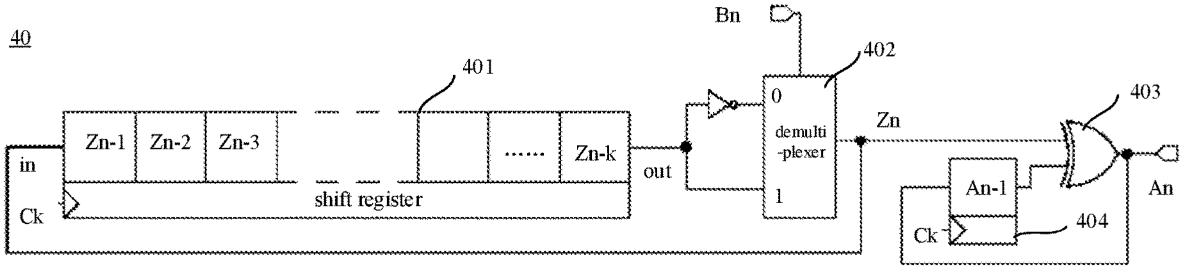
FIG. 11 is a schematic diagram of a structure of a post-processing circuit according to an embodiment of the present disclosure.

FIG. 11 is a schematic structural diagram of a post-processing circuit according to an embodiment of the present disclosure. A feature of the technical solution according to the present disclosure is having a very small circuit, such that area is small and power consumption is low. Referring to FIG. 11, the post-processing circuit 40 includes a storage module 401, a processing module 402 and an operation module 403.

The storage module 401 is configured to store a random sequence.

The processing module 402 is connected to the random number generating circuit 30 and the storage module 401. The processing module 402 is configured to generate a first random number based on the random number output by the random number generating circuit 30 and one bit in the random sequence of the storage module 401.

The operation module 403 is connected to the processing module 402 and configured to output a third random number by performing a logical operation on the first random number output by the processing module 402 and a second random number output by the operation module 403 in the last period.

By calculating the random number output by the random generation circuit 30 and one bit in the random sequence, and then performing a logical operation on the first random number and the second random number output in the last period, the bits 0 and 1 in the random number sequence obtained by performing the above processes are more random due to the randomness of the random sequence.

Exemplarily, the storage module 401 may include a shift register, wherein the shift register is configured to store the random sequence and right shift the random sequence by one bit per period. The random number generating circuit outputs one bit of the random number sequence per period.

Exemplarily, the processing module 402 may include a demultiplexer, wherein the demultiplexer is configured to generate the first random number based on the random number output by the random number generating circuit and the last bit of the shift register, and input the generated first random number to a first bit of the shift register.

Exemplarily, the operation module 403 may include an exclusive-OR operator, wherein the exclusive-OR operator is configured to output the third random number by performing an exclusive-OR on the first random number output by the demultiplexer and the second random number output by the exclusive-OR operator in the last period.

As shown in FIG. 11, a sequence Zn−1 . . . Zn−k is stored in the shift register. Under the control of the clock signal Ck, the sequence is shifted one bit to the right per period, and a bit newly added to the shift register is substituted for Zn−1 by the output Zn of the demultiplexer. Zn is obtained by calculating the last 1 bit of the shift register, Zn−k, and the output Bn of the random number generating circuit. At the same time, the output Zn of the demultiplexer is taken as one input of the exclusive-OR operator, and the output An−1 of the exclusive-OR operator in the last period is taken as the other input of the exclusive-OR operator. An is obtained by performing exclusive-OR on the Zn and the An−1. The post-processing circuit 40 may further include a register 404 to store the An−1. Based on the clock signal Ck, the register 404 may acquire the output of the exclusive-OR operator and store the output at each clock period, and input the stored bit and the output of the demultiplexer to the exclusive-OR operator on the next clock period.

The clock signal for controlling the shift register and the clock signal for controlling the register may be provided by the clock sub-circuit mentioned above. In other implementations, the clock signal for controlling the shift register and the clock signal for controlling the register may be provided by two separate clock circuits.

In this implementation, the demultiplexer determines a current output based on the random number output by the output circuit and the last bit of the shift register. The initial value of the shift register is randomly obtained (bit 0 or 1 is randomly generated at each bit when the shift register is powered up), such that the chaotic character of the random number is increased by calculating the random number output by the output circuit and the initial value of the shift register, and the order of bits 0 and 1 is further scrambled. The exclusive-OR operator performs the foregoing XOR correction, and avoids the occurrence of a continuous 0 or 1 by comparing the output of the demultiplexer with the output of itself in the last period. In the case that a constant 11111 presents, a result of the exclusive-OR operation is 01010, such that occurrence of 0 and 1 is more even.

An occurrence of a constant 0 or a constant 1 can be avoid by utilizing the two devices mentioned above, such that the amount of 0 and 1 is more even and the order of the 0 and 1 is random.

Optionally, the demultiplexer is configured to calculate the first random number according to the following formula.

$$Zn=Bn*Zn-k+Bn^{-1}*Zn-k^{-1};$$

wherein Zn is the first random number, Zn−k is the last bit of the shift register, Bn is the random number output by the random number generating circuit.

Bn−1 is the inverse calculation of Bn, and $Zn-k^{-1}$ is the inverse calculation of Zn−k. The inverse of 0 is 1 and the inverse of 1 is 0. For example, in a case that Bn is 1 and Zn−k is 1, Zn=1; in a case that Bn is 1 and Zn−k is 0, Zn=0; in a case that Bn is 0 and Zn−k is 1, Zn=0; and in a case that Bn is 0 and Zn−k is 0, Zn=1.

Figure 12:
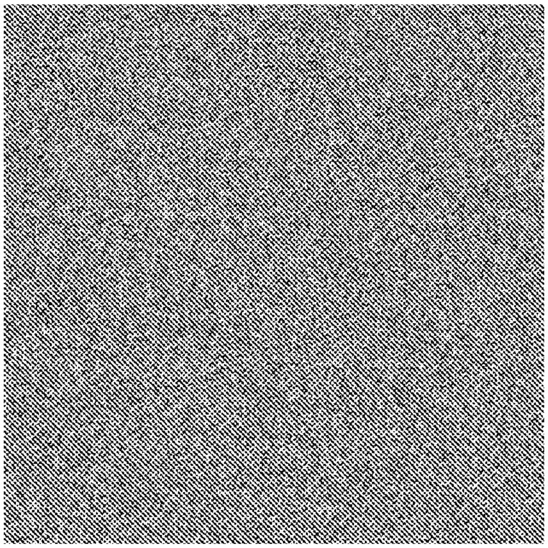
FIG. 12 is a schematic diagram of a random number sequence according to an embodiment of the present disclosure.
Figure 13:
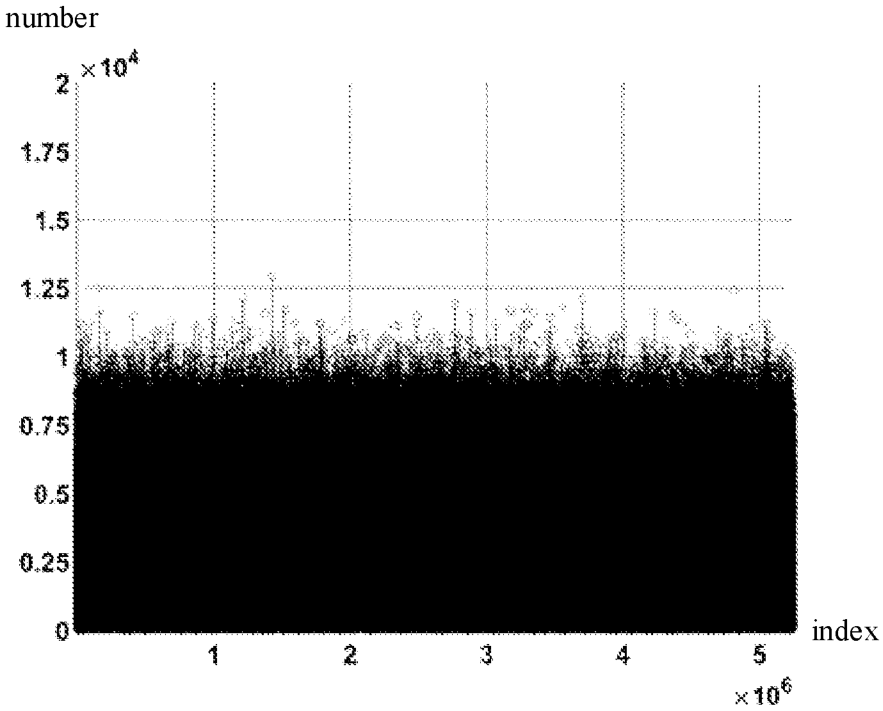
FIG. 13 is a schematic diagram of spectrum information of a random number sequence according to an embodiment of the present disclosure.

The random number generator implemented by performing the method according to the present disclosure can pass all random number tests (international standard of random number test) of National Institute of Standards and Technology (NIST). Referring to FIG. 12, the random numbers output by the random number generator are represented as a graph. By counting various combinations of bit sequences with a determined length in the random number sequence shown in FIG. 12, it can be seen that the number of occurrences of the various combinations are similar, that is, the proportions of the various combinations are similar without significantly high or low. The random number sequence is close to white noise, which proves the generated random number sequence is an unpredictable true random number sequence. Fast Fourier transform may be applied to count the number of occurrences of various combinations. For example, fast Fourier transform is performed on the random number sequence shown in FIG. 12 to obtain a schematic diagram of spectrum information as shown in FIG. 13. Referring to FIG. 13, the abscissa is an index, each index corresponding to one of the combinations of bit sequences with a determined length, and the ordinate is a number of occurrence of the sequence corresponding to the index. As shown in FIG. 13, the test data includes around $5\times10^6$ sequences in total. The number of occurrence of the sequence corresponding to the index 1 is $1.13\times10^4$, and the number of occurrences of the sequences corresponding to other index values are mostly between $1\times10^4$ and $1.25\times10^4$. It can be seen from FIG. 13 that the proportions of occurrences of the various bit sequences are similar. Thus, the random number sequence according to FIG. 12 is a true random number sequence.

The random number generator according to the present disclosure has characteristics such as fully digital, low cost, low power consumption, high reliability and high programming reusable. The random number generator is implemented based on the plurality of frequency synthesizers. The random number generator mixes frequencies of the pulse signals output by the plurality of frequency synthesizers by performing logical operation, to form a high entropy noise source. Then, the random number generator generates a sequence of true random numbers by sampling through the data flip-flop. The post-processing circuit is added to the circuit to increase the complexity of the sequence of true random numbers. The true random numbers generated with this architecture can pass the NIST random number test and have characteristics such as high entropy, high unpredictability, high complexity, and the like. The random number generator may be integrated in a chip, thereby providing efficient and reliable true random numbers in a low cost manner.

Figure 14:
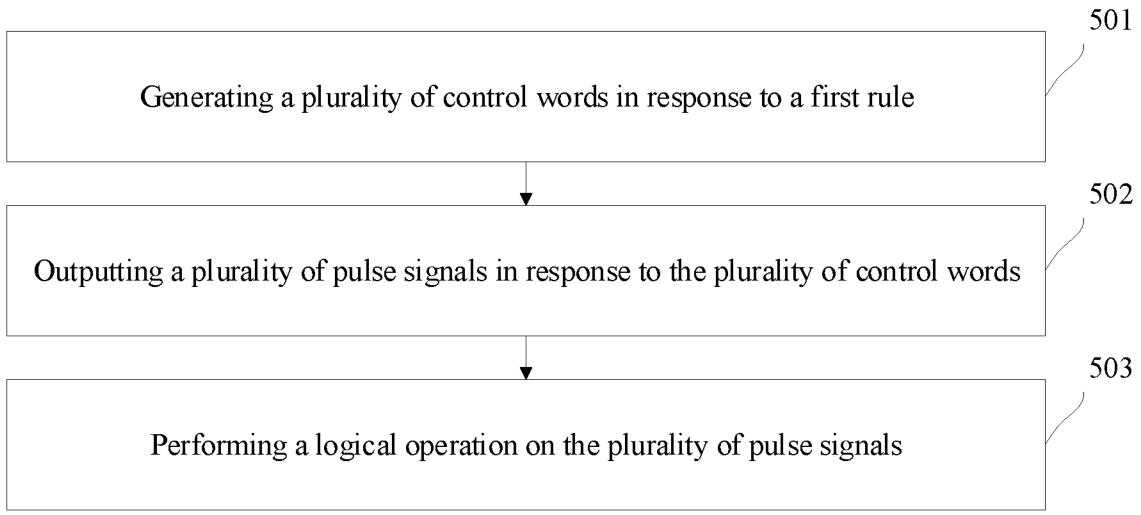
FIG. 14 is a flowchart of a method for generating a random number according to an embodiment of the present disclosure.

FIG. 14 is a flowchart of a method for generating a random number according to an embodiment of the present disclosure. Referring to FIG. 14, the method includes the following processes.

In 501, a plurality of control words are generated in response to a first rule.

In 502, a plurality of pulse signals are output in response to the plurality of control words, wherein each of the pulse signals includes a first frequency signal and a second frequency signal, wherein an occurrence probability of the first frequency signal in the pulse signal is controlled by a control word corresponding to the first frequency signal, and an occurrence probability of the second frequency signal in the pulse signal is controlled by a control word corresponding to the second frequency signal.

Optionally, outputting the plurality of pulse signals in response to the plurality of control words includes:

- generating reference pulse signals with phases evenly spaced in response to the initial pulse signal;
- generating the pulse signal in response to the reference pulse signals and the control word;
- wherein the control word includes a first coefficient and a second coefficient; and
- the pulse signal includes the first frequency signal generated based on the reference pulse signals and the first coefficient and the second frequency signal generated based on the reference pulse signals and the second coefficient, and proportions of the first frequency signal and the second frequency signal in the pulse signal are controlled by the second coefficient.

Exemplarily, the pulse signal is generated according to the following formula: $T_{TAF}=(1-r)*T_A+r*T_B$, $T_A=I*\Delta$, $T_B=(I+1)*\Delta$, $T_{TAF}=(1-r)*I*\Delta+r*(I+1)*\Delta=(I+r)*\Delta$. The control word F is equal to I+r.

$T_{TAF}$ is the period of the pulse signal. $T_A$ is the first frequency signal (or referred to as a first periodic signal). $T_B$ is the second frequency signal (or referred to as a second periodic signal). I is the first coefficient mentioned above, wherein the first coefficient is configured to select from the K-channel reference pulse signals to perform frequency signal synthesis. For example, the control word I is 3. In one period, two reference pulse signals with a phase difference of 3Δ are selected from the K-channel reference pulse signals. Then, the two reference pulse signals are synthesized and $T_A=3\Delta$ is output. In the next period, two reference pulse signals with a phase difference of 4Δ are selected. Then, the two reference pulse signals are synthesized and $T_B=4\Delta$ is output. Δ is the phase difference between any two adjacent signals of the K-channel reference pulse signals with phases evenly spaced. r is the second coefficient mentioned above, wherein the second coefficient is configured to control occurrence probabilities of the first frequency signal and the second frequency signal, r controls the occurrence probability of $T_B$ and 1−r controls the occurrence probability of $T_A$.

In 503, a random number sequence is generated by performing a logical operation on the plurality of pulse signals.

Optionally, generating the random number sequence by performing the logical operation on the plurality of pulse signals includes:

- performing a first processing on the plurality of pulse signals, wherein the first processing includes at least one of exclusive-OR, inclusive-OR, or NAND; and
- performing a second processing on a plurality of pulse signals performed with the first processing, wherein the second processing includes acquiring the random number sequence by sampling, based on a clock signal, the signals output after the first processing is performed.

Optionally, the method further includes:

- performing a probability deviation correction on a random number sequence output by the random number generating circuit.

Exemplarily, performing the probability deviation correction on the random number sequence output by the random number generating circuit includes:

- generating a first random number based on the generated random number sequence and one bit in a random sequence; and
- outputting a third random number by performing a logical operation on the first random number and a second random number output in the last period.

Exemplarily, generating the pulse signal in response to the reference pulse signals and the control word includes:

- generating a first control signal and a second control signal based on the control word;
- selecting a first pulse signal from the reference pulse signals with phases evenly spaced based on the first control signal, selecting a second pulse signal from the reference pulse signals based on the second control signal, and selecting one of the first pulse signal and the second pulse signal as an output signal; and
- generating the pulse signal based on the output signal.

Exemplarily, the method further includes:

- taking an output of one of a plurality of pulse sub-circuits as the clock signal; or taking an output of an external clock as the clock signal.

Exemplarily, each of the plurality of control words is a numerical value and integer portions of the plurality of control words are coprime.

An example of performing the probability deviation correction on the random number sequence output by the random number generating circuit is provided below. The processes of the example are as follows.

The random sequence is stored in a shift register and right-shifted by one bit per period. The random number generating circuit outputs one bit of the random number sequence per period.

The first random number is generated based on the generated random number sequence and the last bit of the shift register. The generated first random number is input to a first bit of the shift register.

The third random number is output by performing an exclusive-OR on the first random number and the second random number output in the last period.

Described above are merely exemplary embodiments of the present disclosure, and are not intended to limit the present disclosure. Within the spirit and principles of the present disclosure, any modifications, equivalent substitutions, improvements, and the like are within the protection scope of the appended claims of the present disclosure.

The invention claimed is:

1. A random number generator, comprising:

a control word providing circuit, configured to generate a plurality of control words in response to a first rule, wherein integer portions of the plurality of control words are coprime;

a pulse generating circuit, connected to the control word providing circuit and configured to output a plurality of pulse signals in response to the plurality of control words, wherein each of the pulse signals comprises a first frequency signal and a second frequency signal, wherein an occurrence probability of the first frequency signal in the pulse signal is controlled by a control word corresponding to the first frequency signal, and an occurrence probability of the second frequency signal in the pulse signal is controlled by a control word corresponding to the second frequency signal; and a random number generating circuit, connected to the pulse generating circuit and configured to generate a random number sequence by performing a logical operation on the plurality of pulse signals.

2. The random number generator according to claim 1, wherein the pulse generating circuit comprises a plurality of pulse sub-circuits, the plurality of pulse sub-circuits being connected to the control word providing circuit and the random number generating circuit; and each of the plurality of pulse sub-circuits being configured to generate one of the plurality of pulse signals based on one of the plurality of control words.

3. The random number generator according to claim 2, wherein each pulse sub-circuit of the plurality of pulse sub-circuits comprises: a signal generator and a frequency synthesizer, wherein the frequency synthesizer is connected to the signal generator, the control word providing circuit, and the random number generating circuit; wherein the signal generator is configured to generate reference pulse signals with phases evenly spaced in response to an initial pulse signal;

the frequency synthesizer is configured to generate the pulse signal in response to the reference pulse signals and the control word;

wherein the control word comprises a first coefficient and a second coefficient; and the pulse signal comprises the first frequency signal generated based on the reference pulse signals and the first coefficient and the second frequency signal generated based on the reference pulse signals and the second coefficient, and proportions of the first frequency signal and the second frequency signal in the pulse signal are controlled by the second coefficient.

4. The random number generator according to claim 3, wherein the frequency synthesizer comprises: a first processing unit, a second processing unit and an output unit; wherein the first processing unit is connected to the control word providing circuit and configured to generate a first control signal and a second control signal based on the control word;

the second processing unit is connected to the first processing unit and configured to select a first pulse signal from the reference pulse signals with phases evenly spaced based on the first control signal, select a second pulse signal from the reference pulse signals based on the second control signal, and select one of the first pulse signal and the second pulse signal as an output signal; and the output unit is connected to the second processing unit and configured to generate the pulse signal based on the output signal of the second processing unit.

5. The random number generator according to claim 4, wherein the random number generating circuit comprises: a first processing sub-circuit and a second processing sub-circuit; wherein the first processing sub-circuit is connected to the pulse generating circuit and configured to perform a first processing on the plurality of pulse signals, the first processing comprising at least one of exclusive-OR, inclusive-OR, or NAND; and the second processing sub-circuit is connected to the first processing sub-circuit and configured to perform a second processing on a plurality of pulse signals performed with the first processing; wherein the second processing comprises acquiring the random number sequence by sampling, based on a clock signal, the signals output by the first processing sub-circuit.

6. The random number generator according to claim 3, wherein the random number generating circuit comprises: a first processing sub-circuit and a second processing sub-circuit; wherein the first processing sub-circuit is connected to the pulse generating circuit and configured to perform a first processing on the plurality of pulse signals, the first processing comprising at least one of exclusive-OR, inclusive-OR, or NAND; and the second processing sub-circuit is connected to the first processing sub-circuit and configured to perform a second processing on a plurality of pulse signals performed with the first processing; wherein the second processing comprises acquiring the random number sequence by sampling, based on a clock signal, the signals output by the first processing sub-circuit.

7. The random number generator according to claim 2, wherein the random number generating circuit comprises: a first processing sub-circuit and a second processing sub-circuit; wherein the first processing sub-circuit is connected to the pulse generating circuit and configured to perform a first processing on the plurality of pulse signals, the first processing comprising at least one of exclusive-OR, inclusive-OR, or NAND; and the second processing sub-circuit is connected to the first processing sub-circuit and configured to perform a second processing on a plurality of pulse signals performed with the first processing; wherein the second processing comprises acquiring the random number sequence by sampling, based on a clock signal, the signals output by the first processing sub-circuit.

8. The random number generator according to claim 7, wherein the random number generating circuit further comprises: a clock sub-circuit, wherein the clock sub-circuit is connected to the second processing sub-circuit and configured to provide the clock signal to the second processing sub-circuit.

9. The random number generator according to claim 8, wherein the clock sub-circuit is configured to take an output of one of the plurality of pulse sub-circuits as the clock signal; or the clock sub-circuit is configured to take an output of an external clock as the clock signal.

10. The random number generator according to claim 1, further comprising:

a post-processing circuit, connected to the random number generating circuit and configured to perform a probability deviation correction on the random number sequence output by the random number generating circuit.

11. The random number generator according to claim 10, wherein the post-processing circuit comprises:

a storage module, configured to store a random sequence;

a processing module, connected to the random number generating circuit and the storage module, and configured to generate a first random number based on a random number output by the random number generating circuit and one bit in the random sequence of the storage module; and an operation module, connected to the processing module and configured to output a third random number by performing a logical operation on the first random number output by the processing module and a second random number output by the operation module in the last period.

12. The random number generator according to claim 1, wherein each of the plurality of control words is a numerical value and integer portions of the plurality of control words are coprime.

13. A method for generating random number, comprising:

generating a plurality of control words in response to a first rule, wherein integer portions of the plurality of control words are coprime;

outputting a plurality of pulse signals in response to the plurality of control words, wherein each of the pulse signals comprises a first frequency signal and a second frequency signal, wherein an occurrence probability of the first frequency signal in the pulse signal is controlled by a control word corresponding to the first frequency signal, and an occurrence probability of the second frequency signal in the pulse signal is controlled by a control word corresponding to the second frequency signal; and generating a random number sequence by performing a logical operation on the plurality of pulse signals.

14. The method according to claim 13, wherein outputting the plurality of pulse signals in response to the plurality of control words comprises:

generating reference pulse signals with phases evenly spaced in response to an initial pulse signal; and generating the pulse signal in response to the reference pulse signals and the control word;

wherein the control word comprises a first coefficient and a second coefficient; and the pulse signal comprises the first frequency signal generated based on the reference pulse signals and the first coefficient and the second frequency signal generated based on the reference pulse signals and the second coefficient, and proportions of the first frequency signal and the second frequency signal in the pulse signal are controlled by the second coefficient.

15. The method according to claim 14, wherein generating the pulse signal in response to the reference pulse signals and the control word comprises:

generating a first control signal and a second control signal based on the control word;

selecting a first pulse signal from the reference pulse signals with phases evenly spaced based on the first control signal, selecting a second pulse signal from the reference pulse signals based on the second control signal, and selecting one of the first pulse signal and the second pulse signal as an output signal; and generating the pulse signal based on the output signal.

16. The method according to claim 13, wherein generating the random number sequence by performing the logical operation on the plurality of pulse signals comprises:

performing a first processing on the plurality of pulse signals, wherein the first processing comprises at least one of exclusive-OR, inclusive-OR, or NAND; and performing a second processing on a plurality of pulse signals performed with the first processing, wherein the second processing comprises acquiring the random number sequence by sampling, based on a clock signal, the signals output after the first processing is performed.

17. The method according to claim 16, further comprising:

taking an output of one of a plurality of pulse sub-circuits as the clock signal; or taking an output of an external clock as the clock signal.

18. The method according to claim 13, further comprising:

performing a probability deviation correction on a random number sequence output by a random number generating circuit.

19. The method according to claim 18, wherein performing the probability deviation correction on the random number sequence output by the random number generating circuit comprises:

generating a first random number based on the generated random number sequence and one bit in a random sequence; and outputting a third random number by performing a logical operation on the first random number and a second random number output in the last period.

20. The method according to claim 13, wherein each of the plurality of control words is a numerical value and integer portions of the plurality of control words are coprime.

* * * * *